United States Patent

[11] 3,634,109

[72] Inventor  Blake F. Mago
               New City, N.Y.
[21] Appl. No. 874,070
[22] Filed     Nov. 4, 1969
[45] Patented  Jan. 11, 1972
[73] Assignee  Union Carbide Corporation
               New York, N.Y.

[54] ZINC-RICH PROTECTIVE COATINGS FOR METALS
     15 Claims, No Drawings
[52] U.S. Cl................................................. 106/1,
                     106/14, 106/287, 117/131, 117/135.1
[51] Int. Cl..................................................... C09d 5/10

[50] Field of Search............................................ 106/1, 14,
                                                    287 B; 117/131, 135.1

[56]                    References Cited
                    UNITED STATES PATENTS
     3,202,517  8/1965  Jarboe et al. ................. 106/14

Primary Examiner—Lorenzo B. Hayes
Attorneys—Paul A. Rose, Louis C. Smith, Jr., George A. Skoler and Aldo John Cozzi ABSTRACT: A protective coating for metals containing an alkyl silicate, zinc dust, monoethanolamine, and an organic acid, preferably an organic branched chain acid such as 2-ethylbutyric acid or 2-ethylhexoic acid.

ZINC-RICH PROTECTIVE COATINGS FOR METALS

This invention relates to new zinc-rich protective coatings for metals.

An important consideration to be given to any coating designed to defend metals from attack is the extent of the binding and adhesive properties of the coating to the metal. If the coating is not capable of remaining firmly attached to the metal substrate which is to be protected, the effectiveness of the coating's chemical defensive properties is minimized. This is particularly true regarding the application of zinc-rich coatings for the galvanic protection of steel, since good electrolytic contact between zinc particles and between them and the metal substrate should be available.

The zinc-rich protective coatings of today contain either an organic or inorganic binder material. The use of an inorganic binder sometimes presents difficulties due to unwanted reactivity with the zinc and/or the substrate to be protected. Undue reactivity can also cause poor "pot life" or other adverse effects, and many inorganic binders contain inhibitors in order to minimize these detrimental aspects. Inhibitors, however, can also adversely affect the fundamental activity of the zinc and the zinc-steel galvanic couple if extensive passivity occurs.

A common inorganic binder is a polysilicate prepared by partial hydrolysis of an alkyl silicate which will then cure further upon exposure to atmospheric moisture. Promoters, either acidic or basic in nature, have been used to improve the hydrolysis and polycondensation of the silicate esters. Studies have tended to show that different mechanisms are involved and that basic promoters seem to be less dependent upon the amount of water present than acidic promoters. Furthermore, the hydrolysis rate and thus, the curing rate, may be faster with basic promoters. In spite of this, silicate esters hydrolyzed by acidic promoters are presently being used as typified by the compositions of U.S. Pat. No. 3,056,684. The silicate esters of the patent are formed by prehydrolyzing tetraethyl orthosilicate with a restricted amount of water in the presence of an acidic component giving a pH of 1.5 to 4.0. When such reaction conditions are used, a chain length of 5 to 10 silicon atoms is reported to develop.

It is an object of the present invention to provide a zinc-rich protective coating for metals using lower molecular weight silicate esters than those presently utilized.

It is another object to provide zinc-rich protective coatings for metals from lower molecular weight silicate esters using basic promoters.

It is yet another object of the present invention to provide a zinc-rich protective coating for metals having at least a 24-hour pot life.

These and other objects of the invention will become obvious by the following disclosure.

It has now been found that a superior zinc-rich protective coating for metals can be made from silicate esters, zinc dust, monoethanolamine as a promoter, and an organic monocarboxylic acid containing from six to 10 carbon atoms and preferably branched chain organic monocarboxylic acids such as 2-ethylbutyric acid and 2-ethylhexoic acid.

The silicate esters found to be useful in the instant compositions are tetraethyl orthosilicate, "condensed" ethyl silicate and ethyl silicate 40. "Condensed" ethyl silicate is tetraethyl orthosilicate containing 10 percent polysilicates and is the undistilled reaction product of silicon tetrachloride and 200-proof ethanol having a nominal composition of 2 to 5 percent ethanol, 90 to 95 tetraethyl orthosilicate and 5 to 10 percent polyethoxy polysilicates. Ethyl silicate 40 is a mixture of polysilicates averaging five silicon atoms per molecule having a silica content of about 40 percent. It is formed by reacting silicon tetrachloride with ethanol containing some water under conditions such that a silica content of about 40 percent results.

Monoethanolamine can be added to the alkyl silicate vehicle in an amount of from about 2 to about 9 percent based upon the total weight of the vehicle, zinc excluded, with an amount of about 5 percent being preferred.

Monoethanolamine is unique among the common amines, even those of similar structure, in the coherence it gives to the coating and the lack of unfavorable effects on adhesion to a steel substrate. This coherence was specific to zinc dust coatings and was not found with the other particulate solids such as aluminum powder, stainless steel powder, micronized mica or zinc oxide. Thus, monoethanolamine may promote a rather special binding action between zinc particles and the polysilicate backbone.

The organic monocarboxylic acids containing from six to 10 carbon atoms useful in the instant invention include hexoic acid, heptanoic acid, octanoic acid, nonanoic acid, and decanoic acid. The preferred organic monocarboxylic acids are branched chain organic monocarboxylic acids such as 2-ethylbutyric acid, 2-ethylpentanoic acid, 2-methylpentanoic acid, 2-ethylhexoic acid, 2-methylnonanoic acid, and 2-ethyloctanoic acid. The particularly preferred branched chain organic monocarboxylic acids are 2-ethylbutyric acid and 2-ethylhexoic acid.

The organic monocarboxylic acids are added to the composition in order to form the corresponding salts of monoethanolamine. It has been found that the use of such salts gives a zinc-rich protective coating, which after application to metal, e.g., steel, performs ably under corrosive conditions. Not only is the metal protected, but the zinc in the protective coating is not excessively attacked.

The organic monocarboxylic acids are added in stoichiometric quantities in order to form the corresponding salts of monoethanolamine.

Organic solvents are preferably used in the alkyl silicate vehicle and those which have been found to be most useful are Cellosolve (ethylene glycol monethyl ether), Cellosolve acetate (ethylene glycol monethyl ether acetate), ethanol, and aromatic solvents such as benzene and toluene. Solvent mixtures are also useful. Aliphatic hydrocarbons such as naphtha and ketones such as methyl amyl ketone did not appear to have the desired compatibility with the active ingredients.

Zinc is added to the vehicle portion of the composition in the form of particles or dust and in amounts of from about 2:1 to about 3:1 based upon the weight ratio of zinc to the vehicle portion.

The following examples are illustrative.

EXAMPLE 1

In this example, a number of acids were investigated as to their effects upon the properties of zinc-rich coatings.

A vehicle comprising 5 percent monoethanolamine and 25 percent ethyl silicate 40 dissolved in a 1:1 by weight mixture of absolute ethanol and Cellosolve was prepared for testing. Monoethanolamine has been disclosed to be a basic promoter for alkyl silicates in British Pat. No. 652,136. Acid was added to the vehicle in an amount equal to the theoretical equivalent to the monoethanolamine present. If the in situ acid salt of monoethanolamine thus produced was sufficiently soluble in the vehicle, then 1 part by weight of the vehicle portion was mixed with 3 parts by weight of New Jersey Zinc No. 444 zinc dust and the resulting coating was applied to a mild steel substrate by brushing. The coated metal panels were allowed to stand for at least 1 day and their resistance to scrubbing was determined with a cleanser and a wet bristle brush. Corrosion protection was determined by immersing panels having exposed steel edges or sides in water containing 500 p.p.m. sodium chloride. Some panels were also exposed on the Cleveland Condensing Humidity Cabinet at a temperature of 120° F.

| Acid added to vehicle | Solubility of "in situ" salt in vehicle | Effect of Acid [1] |
|---|---|---|
| n-Decanoic | Soluble | No significant effect. |
| Lauric | do | Adhesion poor. |
| 2-ethylbutyric | do | Reduced "white" rusting. |
| 2-ethylhexoic | do | Do. |
| Glycolic | Insoluble | |
| Citric | do | |
| Phosphoric | do | |
| Boric | Caused gelation | |

| | | |
|---|---|---|
| Molybdic | Insoluble | |
| Ethyl phosphoric | Incompletely soluble. | |
| Di(2-ethylhexyl)phosphoric. | Soluble | Adhesion poor. |
| Acetic | Caused gelation | |
| Propionic | Soluble | Short pot life. |
| Valeric | do | Objectionable odor. |
| Pivalic | do | Do. |
| n-Hexanoic | do | No significant effect. |
| n-Octanoic | do | Do. |
| n-Nonanoic | do | Do. |
| Tartaric | Insoluble | |
| Succinic | do | |
| Adipic | Soluble | Adhesion poor. |
| Azelaic | do | Do. |
| C₈ alkenyl succinic anhydride. | do | Do. |
| Lauroyl sarcosinate | do | Do. |
| Benzoic | Insoluble | |
| Terephthalic | do | |
| Trimesic | do | |
| Pyromellitic | do | |
| 5-nitrophthalic | Caused gelation | |

¹ Vehicle-zinc dust mixture and properties of zinc-rich coating on steel

Both 2-ethylbutyric acid and 2-ethylhexoic acid were observed to be soluble in the vehicle and gave zinc-rich protective coatings with favorable zinc corrosion rate and good adhesion.

The following table is a summary by type of acid added to the vehicle which shows the advantages of $C_6$ to $C_{10}$ organic monocarboxylic acids and especially the branched chain organic monocarboxylic acids in the instant zinc-rich protective coatings:

| | Type of acid added to vehicle | Solubility of "In situ" salt in vehicle | Effect of acid ¹ |
|---|---|---|---|
| 1 | Lower (less than $C_4$) molecular weight monobasic acids like acetic and propionic. | Satisfactory, but acetic caused gelation. | Short pot life. |
| 2 | Intermediate ($C_4$–$C_{10}$) monobasic acids like n-butyric and 2-ethylhexoic. | Soluble | None.² |
| 3 | Higher (above $C_{10}$) monobasic acids like lauric. | do | Caused poor adhesion to steel substrate. |
| 4 | Dibasic acids like adipic, azelaic, $C_8$ alkenyl succinic acids. | do | Adversely affected coherence or adhesion steel. |
| 5 | Hydroxy-substituted organic acids like glycolic, citric and tartaric acids. | Insoluble | |
| 6 | Inorganic acids like boric, phosphoric and molybdic acids. | do | |
| 7 | Alkylphosphoric acids like ethylphosphoric and di(2-ethylhexyl)phosphoric acids. | Lower molecular weight derivatives insoluble. | Poor adhesion with higher molecular weight derivatives. |
| 8 | Aromatic organic acids like benzoic, phthalic, trimesic, pyromelletic acids. | Insoluble | |

¹ Vehicle zinc dust mixture and properties of zinc-rich coating on steel.
² But branched-chain acids reduced "white" rusting better than straight-chain acids, $C_4$ and $C_5$ acids gave objectionable odor.

EXAMPLE 2

An alkyl silicate vehicle was prepared for stability testing. The formulation was as follows:

| Component | Percent by Weight |
|---|---|
| Monoethanolamine | 5.0 |
| 2-Ethylhexoic acid | 11.8 |
| Ethyl silicate 40 | 30.0 |
| Absolute ethanol | 26.2 |
| CELLOSOLVE solvent | 26.2 |
| "Thixcin" R | 0.8 |

The vehicle is mixed 1:3 by weight with zinc dust just prior to use and then applied to a steel substrate that has been blasted to at least commercial whiteness in the usual manner.

When precautions are taken to employ ingredients which are sufficiently anhydrous, the vehicle has been found to have a shelf life that exceeds 6 months.

Mixtures with zinc dust have at least a pot life of 24 hours if moisture pickup is excluded.

What is claimed is:

1. In a zinc-rich coating composition comprising zinc dust and a vehicle containing an alkyl silicate, monoethanolamine and a nonaqueous solvent; the improvement comprising an organic monocarboxylic acid having from six to 10 carbon atoms in said vehicle in an amount sufficient to form the corresponding salts of said amine.

2. The coating composition of claim 1 wherein said alkyl silicate is tetraethyl orthosilicate.

3. The coating composition of claim 1 wherein said alkyl silicate is an ethyl polysilicate composition containing about 40 percent silica.

4. The coating composition of claim 1 wherein said alkyl silicate is condensed ethyl silicate and is the reaction product of silicon tetrachloride and absolute ethanol.

5. The coating composition of claim 1 wherein said organic monocarboxylic acid is a branched chain organic monocarboxylic acid.

6. The coating composition of claim 5 wherein said branched chain organic monocarboxylic acid is 2-ethylbutyric acid.

7. The coating composition of claim 5 wherein said branched chain organic monocarboxylic acid is 2-ethylhexoic acid.

8. The coating composition of claim 1, wherein said solvent is selected from the group consisting of ethylene glycol monoethyl ether, ethylene glycol monoethyl ether acetate, ethanol, benzene, toluene and mixtures thereof.

9. The coating composition of claim 8 wherein said solvent is ethanol.

10. The coating composition of claim 8 wherein said alkyl silicate is tetraethyl orthosilicate.

11. The coating composition of claim 8 wherein said alkyl silicate is an ethyl polysilicate composition containing about 40 percent silica.

12. The coating composition of claim 8 wherein said alkyl silicate is condensed ethyl silicate and is the reaction product of silicon tetrachloride and absolute ethanol.

13. The coating composition of claim 8 wherein said organic monocarboxylic acid is a branched chain organic monocarboxylic acid.

14. The coating composition of claim 13 wherein said branched chain organic monocarboxylic acid is 2-ethylbutyric acid.

15. The coating composition of claim 13 wherein said branched chain organic monocarboxylic acid is 2-ethylhexoic acid.

* * * * *